(12) United States Patent
Handshaw

(10) Patent No.: US 11,734,528 B1
(45) Date of Patent: Aug. 22, 2023

(54) USER INTERFACE LED SYNCHRONIZATION FOR VISION CAMERA SYSTEMS

(71) Applicant: ZEBRA TECHNOLOGIES CORPORATION, Lincolnshire, IL (US)

(72) Inventor: Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/710,099

(22) Filed: Mar. 31, 2022

(51) Int. Cl.
- G06K 7/10 (2006.01)
- G06K 7/14 (2006.01)
- H04N 23/72 (2023.01)

(52) U.S. Cl.
CPC ....... G06K 7/10722 (2013.01); G06K 7/1413 (2013.01); H04N 23/72 (2023.01)

(58) Field of Classification Search
CPC .......................... G06K 7/10722; H04N 23/72
USPC ..................................... 235/462.41
See application file for complete search history.

(56) References Cited

U.S. PATENT DOCUMENTS

2013/0126618 A1* 5/2013 Gao ................ G06K 7/10
                                          235/469

* cited by examiner

Primary Examiner — Toan C Ly

(57) ABSTRACT

An imaging device includes a housing having an optically transmissive window, a first imaging assembly, a second imaging assembly, and illumination emitter for generating a user interface visual indicator. The illumination emitter may be a light emitting diode or other light source. To prevent internal reflection of the user interface visual indicator off the window and appearing in captured images from the imaging assemblies, the imaging device synchronizes emitter-on times and sensor exposure-on times to prevent substantial overlap therebetween, thereby allowing for more accurate image captures, including color image captures of the imaging device.

29 Claims, 13 Drawing Sheets

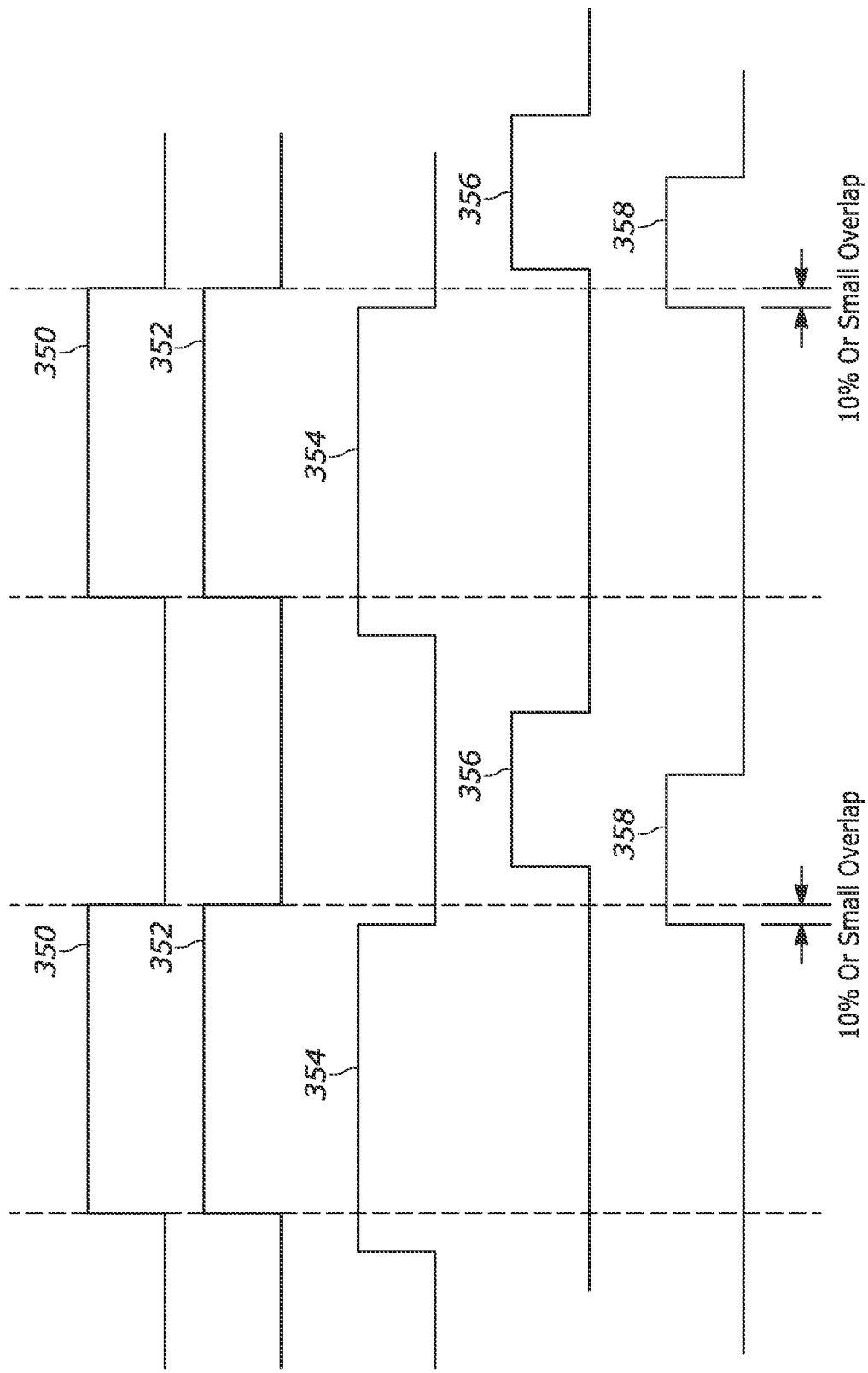

USER INTERFACE LED SYNCHRONIZATION FOR VISION CAMERA SYSTEMS

BACKGROUND

In slot scanner designs, it is preferable to arrange the user interface (UI) light emitting diode (LED) to be visible through the scan window. This allows different versions of the slot scanner (e.g., vertical and horizontal orientations) to have a visible user interface light even when the slot scanner is integrated into a kiosk or other recessed part of a checkout station. Because the horizontal slot scanners are recessed into the countertop and require their platters to be covered in sheetmetal, the typical place for a UI light source of any size is behind the scan window. One could place a UI LED in a location outside the scan window, for example, protruding through the sheetmetal, but the UI LED would be damaged and scuffed by products being dragged across the platter.

However placing a UI source behind the scan window presents problems, especially for slot scanners that include more than one imaging sensor, such as slot scanners with both a monochromatic imager and a color vision camera. Vision cameras have such wide viewing angles in order to pick up on instances of scan avoidance and to achieve better object recognition, these vision cameras will see internal reflections off the scan window. Namely, vision cameras can pick up reflections of the user interface source in the scan window. The erroneous reflection problem is worsened with horizontal slot scanners, as the reflection will propagate farther along into the vision camera's field of view as the reflection bounces between parallel windows, the scan window and the horizontal platter window.

There is a significant need for techniques to overcome this problem, as vision camera slot scanners increase in use and design.

SUMMARY

In one embodiment, an imaging device comprises: a housing having an optically transmissive window; one or more imaging assemblies mounted within the housing, each of the one or more imaging assemblies having an imaging sensor for capturing images of a respective environment appearing within a respective field of view (FOV) extending through the optically transmissive window and each of the one or more imaging assemblies having an exposure-on time during which the imaging sensor is exposed for image capture; an illumination assembly mounted within the housing and configured to generate an illumination through the optically transmissive window during at least one of the exposure-on times; a user interface (UI) light emitter mounted within the housing and configured to generate a UI visual indicator visible through the optically transmissive window during a UI emitter-on time; one or more processors; and a non-transitory computer-readable memory coupled to the one or more processors and storing instructions thereon that, when executed by the one or more processors, cause the one or more processors to; and synchronize operation of the user interface light emitter and the one or more imaging assemblies such that the UI light emitter-on time and the exposure-on time for each of the one or more imaging assemblies do not overlap significantly in time.

In a variation of this embodiment, the one or more imaging assemblies comprises: a first imaging assembly having a first imaging sensor configured to capture image data of an indicia within a respective environment appearing within the respective FOV of the first imaging assembly; and a second imaging assembly having a second imaging sensor configured to capture image data of the respective environment appearing within the respective FOV of the second imaging assembly.

In some such variations, the second imaging sensor is a color imaging sensor. In some such variations, the first imaging sensor is a barcode imaging sensor.

In some variations, the memory stores instructions that, when executed by the one or more processors, cause the one or more processors to the synchronize operation of the user interface light emitter and the one or more imaging assemblies such that the UI light emitter-on time and the exposure-on time for each of the one or more imaging assemblies do overlap by 10% or less of the exposure-on time.

In some variations, the memory stores instructions that, when executed by the one or more processors, cause the one or more processors to: transmit a timing signal from the second imaging assembly to the first imaging assembly through a wired communication link, the timing signal indicating the exposure-on time and/or exposure off time of the second imaging assembly; and in response to the timing signal, the one or more processors controlling the UI light emitter to operate during the UI emitter-on time during the exposure off time of the second imaging assembly.

In some variations, the memory stores instructions that, when executed by the one or more processors, cause the one or more processors to: receive from the second imaging assembly a plurality of the images in the second FOV over a sampling time window; identify, in the plurality of the images, a reflection of the UI visual indicator during the sampling time window; determine a frequency, period, and/or timing of the UI visual indicator; and synchronize a frequency, period, and/or timing of the exposure-on time of the second imaging assembly, such that the UI light emitter-on time and the exposure-on time do not overlap in time.

In some variations, the memory stores instructions that, when executed by the one or more processors, cause the one or more processors to: instruct the second imaging assembly to capture the plurality of the images in the second FOV over a sampling time window by capturing the plurality of the images in a confined, predetermined region of the second FOV.

In some variations, the identified reflection of the UI visual indicator is a reflection from the optically transmissive window.

In some such variations, the housing is mounted within a frame structure having a frame window external to the optically transmissive window, and wherein the identified reflection of the UI visual indicator is a reflection of one or both of the optically transmissive window and the frame window.

In some variations, the respective FOVs are sized the same.

In some variations, one of the respective FOVs is narrower than another of the respective FOV.

In some variations, the UI light emitter is an LED light emitter or laser emitter.

In some variations, the housing is configured for vertically or substantially vertically positioning the optically transmissive window, wherein substantially vertically is from +15° to −15° as measured from an external vertical plane.

In some such variations, the UI light emitter is mounted within the housing to coincide with an upper portion of the housing. In some such variations, the UI light emitter is mounted within the housing to coincide with a lower portion of the housing.

In some variations, one or more of the respective FOVs are defined by one or more internal mirrors within the housing.

In some variations, the housing is configured for horizontally positioning the frame window and wherein the optically transmissive window is from +5° and −5° as measured from an external reference horizontal plane.

In some variations, the UI light emitter is configured to generate the UI visual indicator in response to a scan event detected at the imaging device.

In another embodiment, an imaging device comprises: a housing having an optically transmissive window; a first imaging assembly mounted within the housing including a first imaging sensor having a first field of view (FOV) extending through optically transmission window, the first imaging assembly being configured to capture image data of an indicia within the environment appearing in the first FOV; a second imaging assembly mounted within the housing including a second imaging sensor having a second field of view (FOV) extending through optically transmission window, the second imaging assembly being configured to capture image data of an environment appearing within the second FOV during an exposure-on time; an illumination assembly mounted within the housing and configured to generate an illumination through the optically transmissive window during at least one of the exposure-on times; a user interface (UI) light emitter mounted within the housing and configured to generate a UI visual indicator visible through the optically transmissive window during a UI emitter-on time, the UI light emitter further configured to change states between the UI emitter-on time and a UI emitter-off time in response a trigger event at the imaging device; one or more processors; and a non-transitory computer-readable memory coupled to the one or more processors and storing instructions thereon that, when executed by the one or more processors, cause the one or more processors to; determine from the captured images of the second imaging assembly whether the UI light emitter changed states between the UI emitter-on time and the UI emitter-off time indicating a user scanning event at the imaging device; determining at the first imaging assembly an indicia decode event; and responsive to a comparison of the user scanning event and the indicia decode event, determining between an improper scan attempt and a proper scan attempt.

In an variation of this embodiment, the memory stores instructions that, when executed by the one or more processors, cause the one or more processors to: determine from the captured images when the UI light emitter changes states from the UI emitter-on time to the UI emitter-off time indicating the user scanning event.

In some variations, the memory stores instructions that, when executed by the one or more processors, cause the one or more processors to: determine from the captured images when the UI light emitter changes states from the UI emitter-off time to the UI emitter-on time indicating the user scanning event.

In some variations, the UI light emitter is configured to change states between the UI emitter-on time and the UI emitter-off time in response an attempt to decode the indicia.

In some variations, the memory stores instructions that, when executed by the one or more processors, cause the one or more processors to determine from the captured images of the second imaging assembly whether the UI light emitter changed states between the UI emitter-on time and the UI emitter-off time by: capturing the images over a confined, predetermined region of the second FOV; and identifying the UI visual indicator in one or more of the capture images.

In some variations, the second imaging sensor is a color imaging sensor.

In some variations, the first imaging sensor is a barcode imaging sensor.

In some variations, the UI light emitter is an LED light emitter or laser emitter.

In some variations, the housing is configured for vertically or substantially vertically positioning the optically transmissive window, wherein substantially vertically is from +15° to −15° as measured from an external vertical plane.

In some variations, the housing is configured for horizontally positioning the frame window and wherein the optically transmissive window is from +5° and −5° as measured from an external reference horizontal plane.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 13 illustrates example synchronization timing sequences between an user interface and imaging assemblies of an imaging device.

Figure 1:
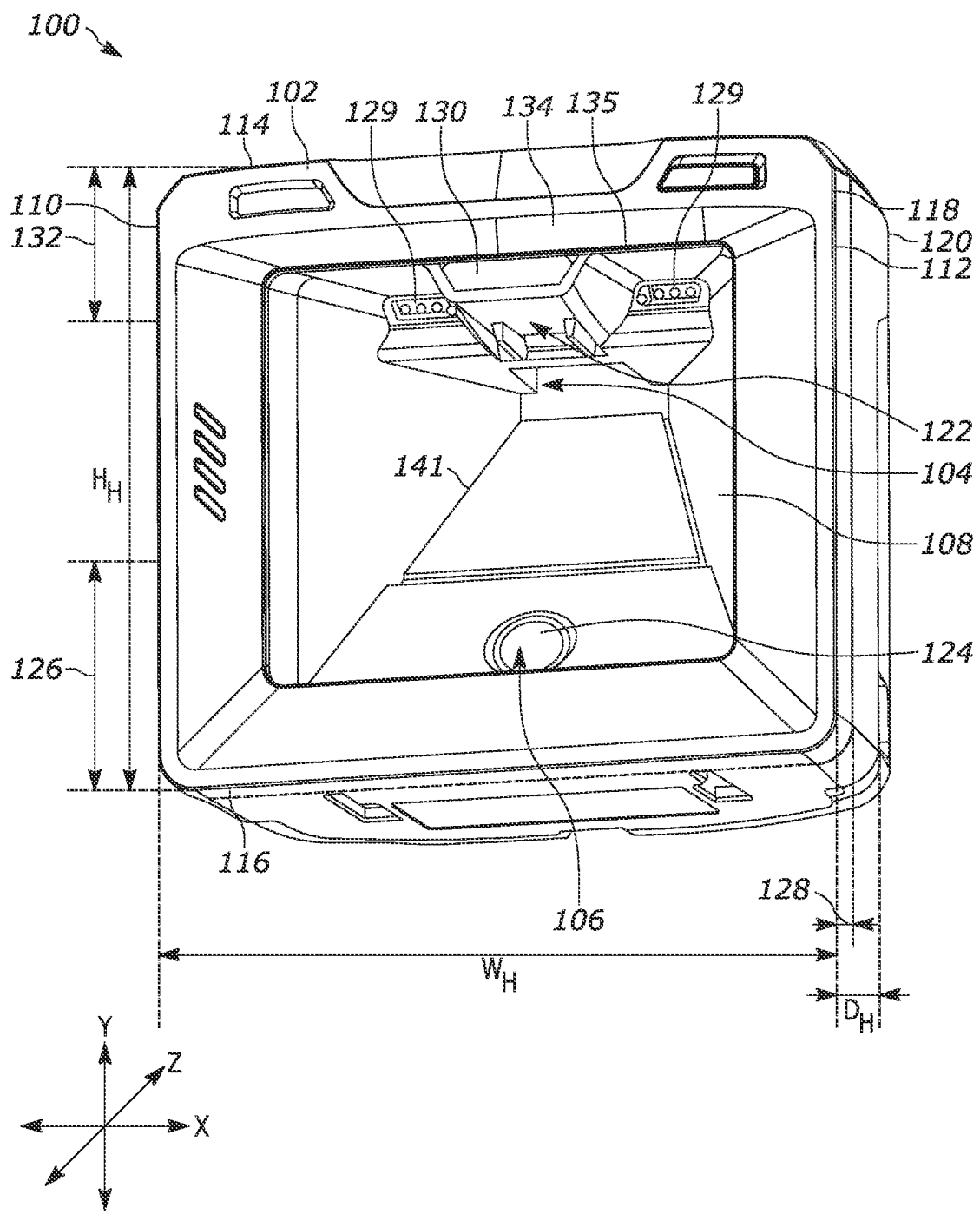
FIG. 1 illustrates a perspective view of an example imaging device having a first imaging sensor, a second imaging sensor, and a user interface emitter.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, vision camera systems having one or more imaging assemblies and a user interface (UI) light source, such as light emitting diode (LED), laser, or other illumination source, are provided. These vision camera systems may be configured as slot scanners, for example. The imaging assemblies may include an indicia imaging assembly, such as a barcode reader, having an imaging sensor with a first field of view (FOV) extending through an optically transmission window of the slot scanner. The imaging assemblies may include a color imaging assembly having a second imaging sensor with a second FOV through the optically transmission window.

The vision camera system is able to synchronize operation of the UI light source with one or more of the imaging assemblies to avoid exposure of the UI light source during image capture. In various examples, the UI light source is controlled to only turn on in between color camera exposure periods. Since the frame rate of these imaging sensors is typically 45 fps or greater, this duty cycle should not fall within a user's flicker fusion threshold, and therefore would not appear as visible flicker on the UI light source. Thus, the user would still see the user interface LED, for example, while a color vision camera or a barcode imager would not. The designs may be used in both a vertical slot scanner orientation and a horizontal slot scanner orientation. Further, as described herein, synchronization can be achieved in various ways, for example, by using a wired connection between a vision camera imaging assembly and a barcode scanner imaging assembly printed circuit board (PCB). In various other examples, synchronization can be achieved by the vision camera imaging assembly taking rapid sample exposures to determine a frequency and time period of the UI light source operation and then intelligently timing its future exposures to avoid those flashes.

An imaging device 100 in shown in FIG. 1 having a housing 102, a first imaging assembly 104, and a second imaging assembly 106. The housing 102 incudes a window 108 that is optically transmissive, thereby allowing the first imaging assembly 104 and the second imaging assembly 106 to collect images through the window 108. In the arrangement depicted, the window 108 is positioned substantially vertically. In other arrangements, the window 108 may be positioned substantially horizontally or at an angle between vertical and horizontal. For example, the housing 102 may be shaped, mounted, or otherwise configured to vertically orient the optically transmissive window 108 or to substantially vertically orient the window 108, where "substantially vertically" oriented herein refers to being in a range of from +15° to −15° to a reference vertical plane. Further, as shown in other examples herein, the housing 102 may be shaped, mounted, or otherwise configured to horizontally orient the optically transmissive window 108 to be in a range from +5° to −5° to a reference horizontal plane. The housing 102 has a housing width $W_H$ between a first side 110 and a second side 112 along an x-axis, a housing height $H_H$ between a top 114 and a bottom 116 along a y-axis, and a housing depth $D_H$ between a front 118 and a back 120 along a z-axis.

The first imaging assembly 104 includes a first imaging sensor 122 mounted to a first printed circuit board (PCB) 161, and the second imaging assembly 106 includes a second imaging sensor 124 mounted to a second PCB 163. The second imaging sensor 124 is positioned along the y-axis within a bottommost portion 126 of the housing height $H_H$ and along the z-axis within a frontmost portion 128 of the housing depth $D_H$ relative to the window 108. The bottommost portion 126 may be a bottom half, a bottom third, or a bottom quarter of the housing height $H_H$. The frontmost portion 128 may be within 0.5 to 3 inches of the front 118 along the z-axis. In particular, the frontmost portion may be within 1.5 inches of the front 118 along the z-axis.

The imaging device 100 further includes a general illumination emitter 129 configured to generate an illumination light visible through the window 108. The illumination emitter 129 may by a white light source, or near white light source, such as an LED illumination source. The illumination emitter 129 may be provided to illuminate a field of view to better enable capturing of image data by imaging assemblies, in particular to illuminate that field of view during image data capture by various imaging assemblies of the imaging device 100. In addition, to the illumination emitter 129, the imaging device 100 further includes a user interface (UI) illumination emitter 130 configured to generate an UI light visible through the window 108, for example, using a user interface (UI) light emitted diode (LED). The UI emitter 130 may generate the UI light appearing, through the window 108 as point light source or a line light source, for example, providing a visual indication to the user of an event such as, decode completion, error identification, malfunction indicator, device powered on, wireless connection established, operational mode, or any other event for providing visual indication to a user. In various examples, the illumination emitter 130 is a monochromatic light source. Further, the UI emitter 130 may be lightpipe or diffuser. The UI emitter 130 may therefore have different sizes, for example, using a diffuser which would make UI light larger and, therefore, more visible to a user. Indeed, in some examples, the present techniques allow for the user of larger UI emitters because of the removal of deleterious internal reflections.

The UI emitter 130 may be positioned along the y-axis within a topmost portion 132 of the housing height. The topmost portion 132 may be a top half, a top third, or a top quarter of the housing height $H_H$. The housing 102 includes a baffle 134 adjacent a top 135 of the window 108 to limit an illumination divergence of the UI light generated by the UI emitter 130. Specifically, the baffle 134 may be configured to limit the illumination light generated by the UI emitter 130 for use by the first imaging sensor 122 or the second imaging sensor 124, for example, to prevent the UI LED light from shining into a user's eyes when the imaging device 100 is maintained in a normal operating orientation. In some arrangements, the baffle 134 may be further configured to prevent light from unnecessarily shining into a user's eyes. Further still, the baffle 134 may be configured to provide similar protection preventing the illumination from the general illumination emitter 129 from being visible to a user through the window 108. As used herein, the terms topmost and bottommost are used for convenience purposes and in reference to the imaging device 100 being in an upright position (i.e., a vertical orientation). In a horizontal orientation, the relative positions or portions would have a different relationship than topmost and bottommost. While the UI emitter 130 is shown in the topmost portion 132 of the housing 102, the UI emitter 130 may be positioned at any location that provides the UI light to a user during operation, including a bottommost portion, a rightmost portion, or a leftmost portion of the housing 102.

The first imaging sensor 122 (shown in FIG. 2) has a first field of view (FOV) 136 (shown in FIG. 2) extending through the window 108, where in the illustrated example the FOV 136 extends from the first imaging sensor 122 and is reflected out the window 108 by an internal mirror 141. The first imaging assembly 104 (shown in FIG. 2) is configured to capture image data that is used by a decoder to decode indicia data, such as barcodes, captured within the image data, that image data captured from the first FOV 136 (shown in FIG. 2). The second imaging sensor 124 (shown in FIG. 2) has a second field of view (FOV) 138 (shown in FIG. 2) extending through the window 108. The second imaging assembly 106 (shown in FIG. 1) is configured to capture images in the second FOV 138 (shown in FIG. 2). Specifically, the second imaging assembly 106 may be configured to capture color images in the second FOV 138. The color images may be used for at least one of a video stream, a ticket switching application, a scan avoidance application, facial recognition, gesture recognition, a convolutional neural network based application, and product identification.

In some examples, the first FOV 136 may be directed downwardly, more specifically a centroidal axis thereof, with respect to a horizontal plane $P_H$. For example, the first FOV 136 may be directed downwardly with respect to the horizontal plane $P_H$ at an angle between 5 and 20 degrees and may cover at least half of the window 108. The second FOV 138, more specifically a centroidal axis thereof, is directed upwardly with respect to the horizontal plane $P_H$. For example, the second FOV 138 may be directed upwardly with respect to the horizontal plane $P_H$ at an angle between 15 and 30 degrees and may cover at least half of the window 108. Because the first FOV 136 and the second FOV 138 are angled differently, the combination of the first FOV 136 and the second FOV 138 may enable the imaging device 100 to see multiple sides of an item for improved ticket switching detection. The second FOV 138 may overlap at least 75 percent of the first FOV 136.

The illumination emitter 129 may be positioned to direct its illumination light outward from the window 108 and having a central illumination axis along the horizontal plane $P_H$ and aligned with the topmost portion 132. In some arrangements, the illumination emitter 129 is positioned to direct the illumination light downwardly with respect to the horizontal plane $P_H$ (shown in FIG. 2). In some arrangements, the illumination emitter 129 (shown in FIG. 1) may be directed to illuminate all of the second FOV 138 (shown in FIG. 2) up to four inches away from the front 118 of the housing 102 (shown in FIG. 1) along the z-axis. In some arrangements, the illumination emitter 129 (shown in FIG. 1) may be directed to illuminate 50% or more of the second FOV 138 (shown in FIG. 2) within the first five inches away from the front 118 of the housing 102 along the z-axis.

The second imaging assembly 106 is configured to capture image data and provide that image data to a decode that identifies n indicia, label, dimension, shape, and/or other imaging characteristics associated with a product within imaged data. The decode may be further configured to determine whether the indicia, label, dimension, shape, and/or other imaging characteristics associated with the product was captured in the image data in the first FOV 136. In this way, the second imaging assembly 106 may be used by the imaging device 100 in the detection of scan avoidance and/or ticket switching.

Figure 2:
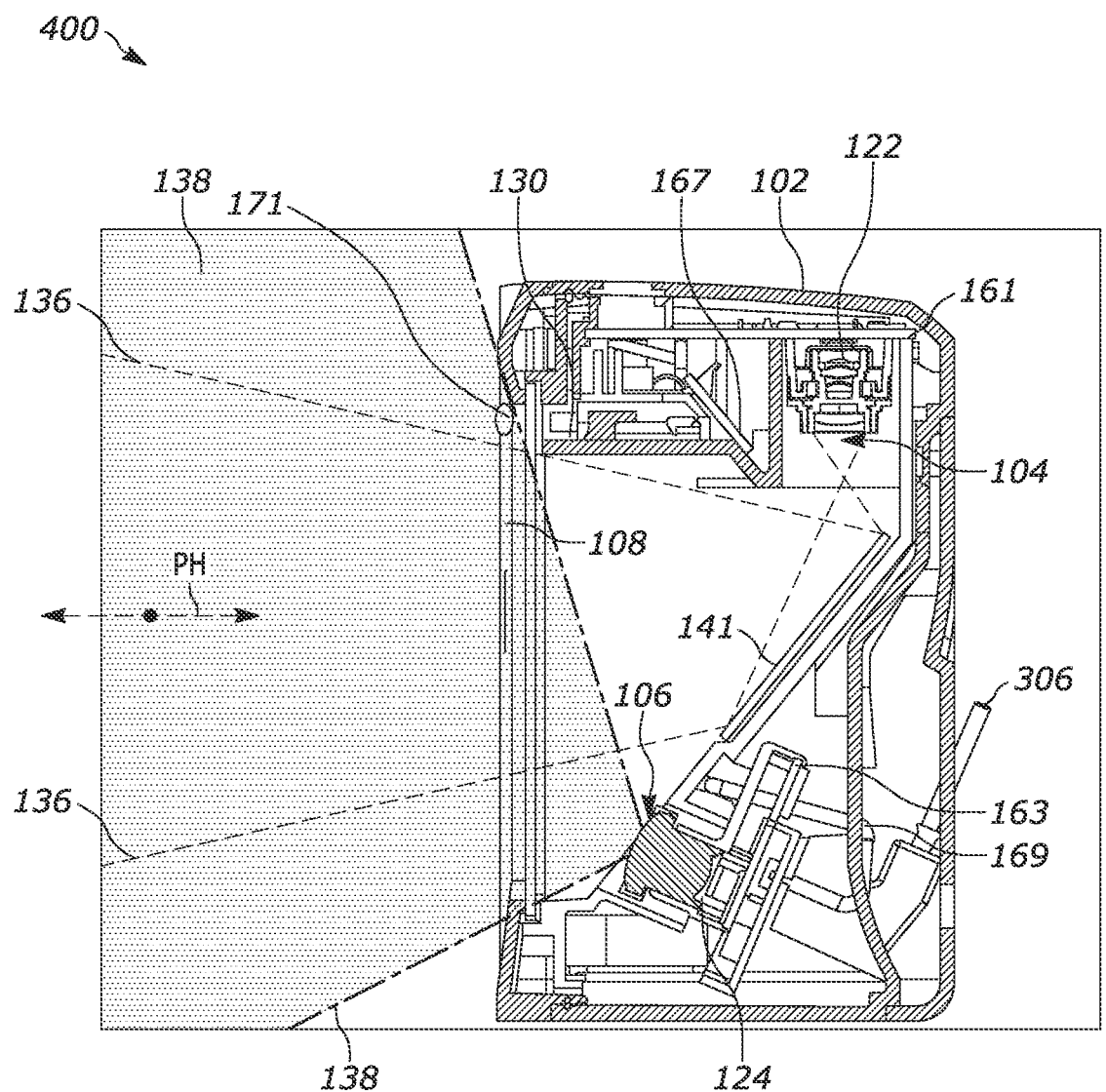
FIG. 2 illustrates a cross-section view of the example imaging device of FIG. 1 in a portrait or vertical orientation.
Figure 3:
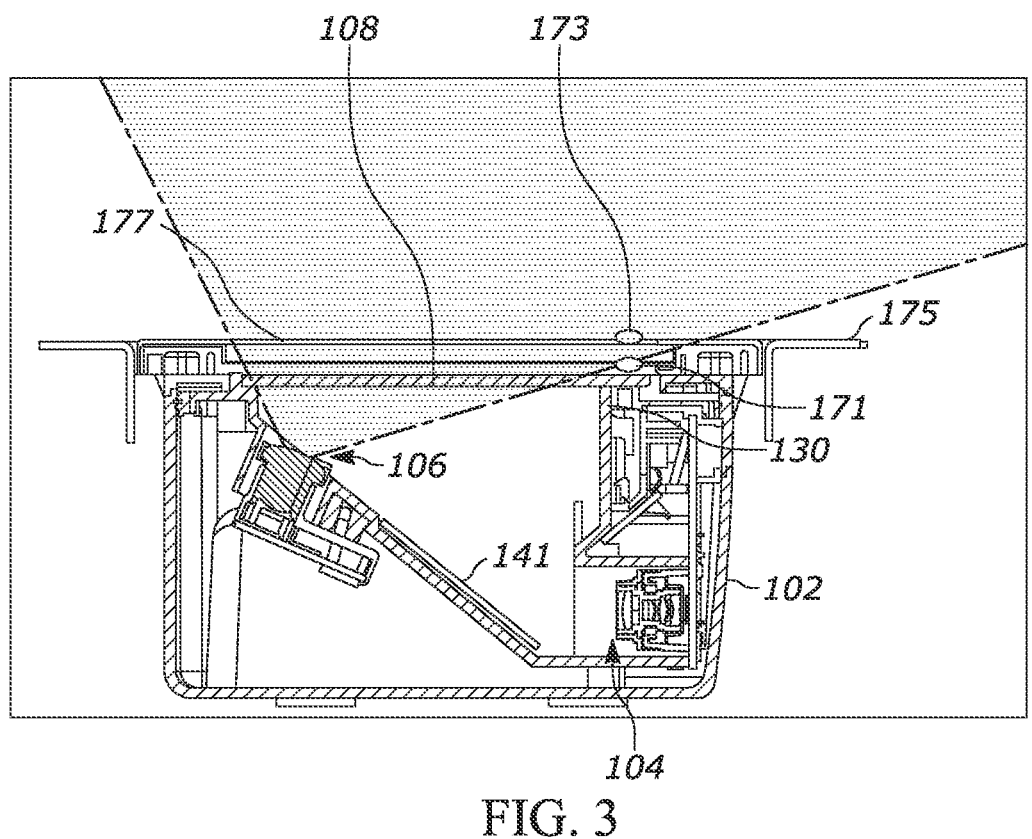
FIG. 3 illustrates a cross-section view of the example imaging device of FIG. 1 in a landscape or horizontal orientation.
Figure 4:
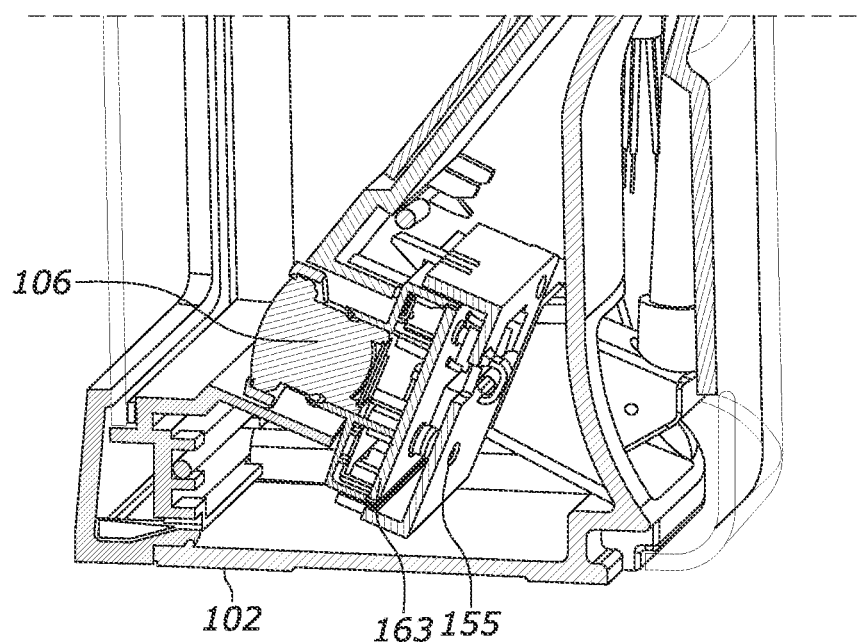
FIG. 4 illustrates a side cross-sectional view of the example imaging device of FIGS. 1 and 2 with the second imaging sensor positioned in the portrait orientation.
Figure 5:
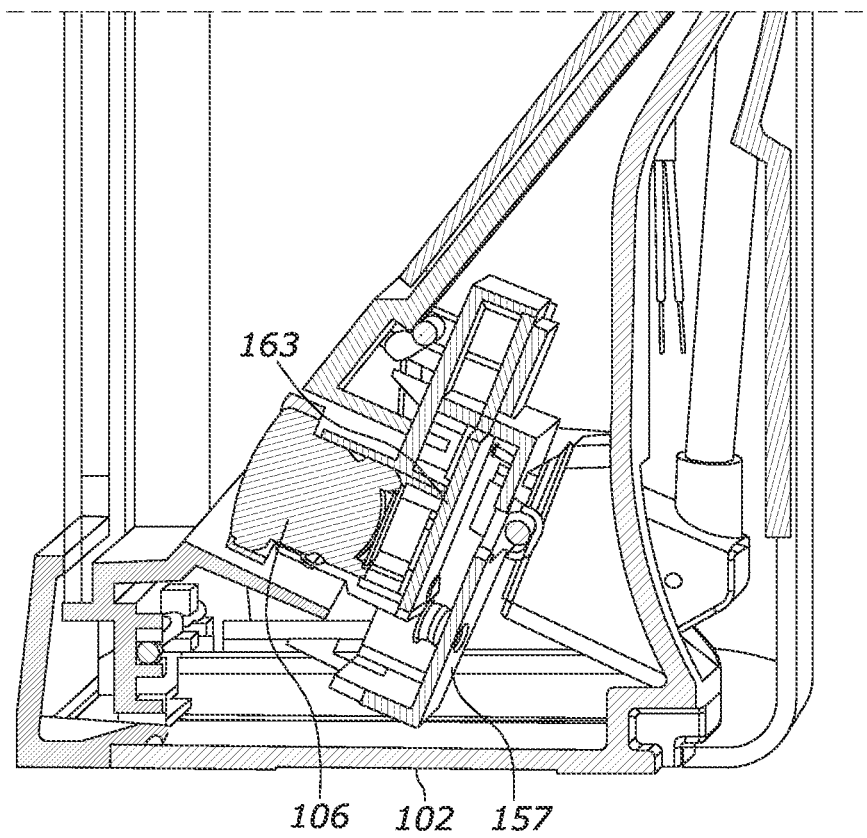
FIG. 5 illustrates a perspective view of the example imaging device of FIGS. 1 and 2 with the second imaging sensor positioned in a landscape orientation.

The imaging device 100 may be positioned in a vertical orientation, for example, as shown in FIG. 1 or a horizontal orientation, for example, as shown in FIG. 3. In some examples, the imaging device 100 is configured for quick adaptability into either of these orientations by having an adjustable mounted second imaging sensor 124. For example, the second imaging sensor 124 may be positioned by the second imaging assembly 106 in a portrait (vertical) orientation (see, e.g., FIG. 2) or a landscape (horizontal) orientation (see, e.g., FIG. 3). FIGS. 4 and 5 illustrate a mounting assembly 157 that may be used to mount the second imaging assembly 106 in a portrait orientation for the vertical orientation of FIG. 1 or a landscape orientation for the horizontal orientation of FIG. 3, with enough space within the housing 102 for the mounting assembly 157 to be rotated 90 degrees. For purposes of this application, the height of a standard counter is defined as 36 inches. The orientation of FIG. 3 may be used for platter or tabletop implementations. In the illustrated example, the housing 102 may be mounted in a recess of a frame 175 and where a frame window 177 is an optically transmissive protective layer, such as a sapphire window. As discussed further below, in some examples, an internal reflection (see location 171) of the UI emitter 130 may occur off the optically transmissive window 108 and/or a second internal reflection (see location 173) may occur off the frame window 177.

Figure 6:
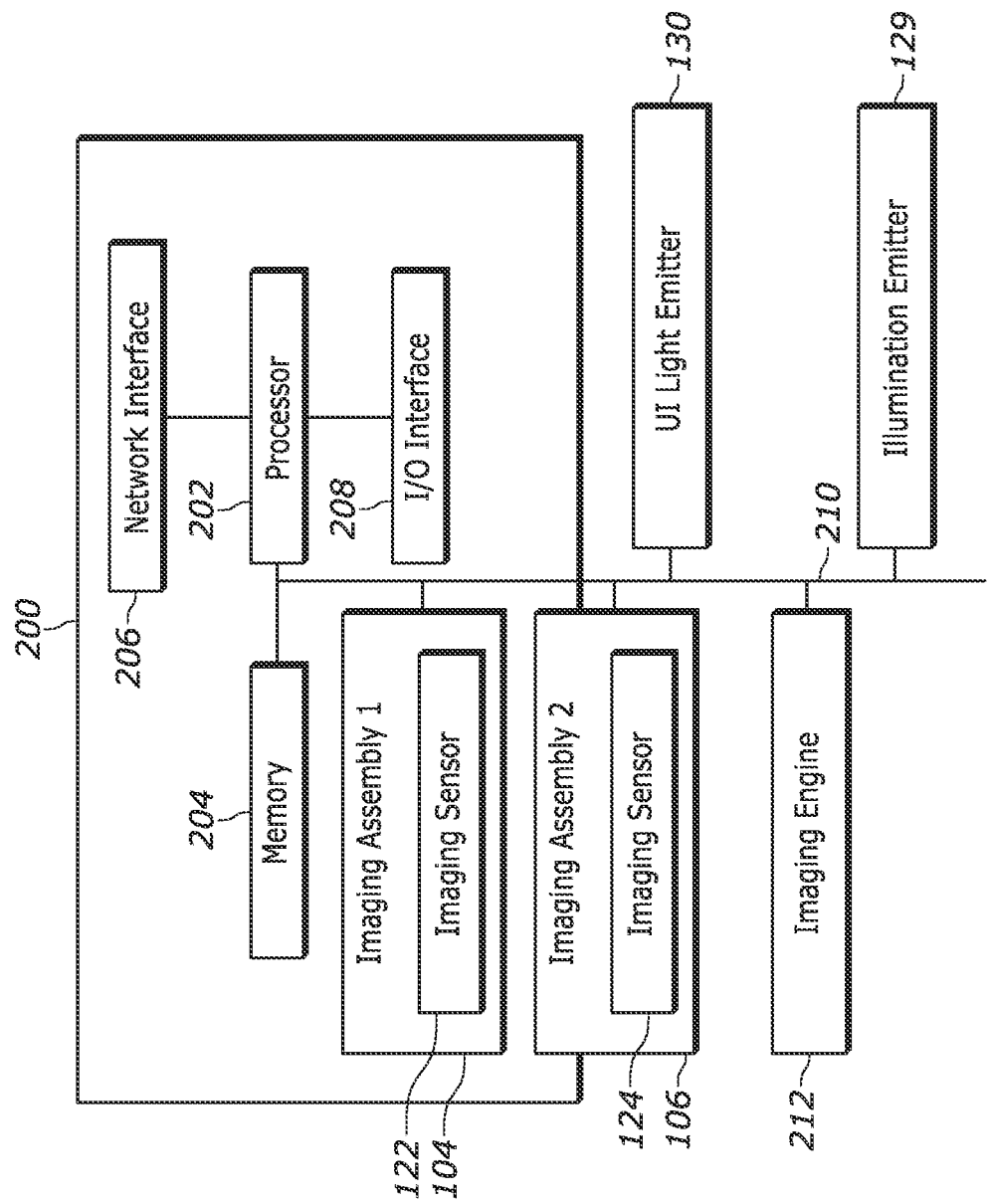
FIG. 6 is a block diagram of an example logic circuit for implementing example methods and/or operations described herein, as may be implemented within the imaging device of FIGS. 1-5 and 9-11.

FIG. 6 is a block diagram representative of an example logic circuit that may be used to implement, for example, one or more components of the imaging device 100 of FIG. 1. The example logic circuit may be used to synchronize operation between a general illumination emitter and one or more imaging assemblies of an imaging device. Moreover, for the examples herein, the example logic circuit may be used to synchronize operation between an UI emitter and one or more imaging assemblies of an imaging device. For example, the logic circuit of FIG. 6 may be used to synchronize operation of UI light emitter and one or more imaging assemblies such that an UI light emitter-on time and the exposure-on times of the one or more imaging assemblies do not overlap significantly in time, where no significant overlap, in the present application, refers to no more than 10% of the total exposure time overlaps with the UI light emitter time. That is, in various embodiments, there will be 10% or less overlap, and in many of those embodiments there will be no overlap. More generally, the example logic circuit of FIG. 6 is a processing platform 200 capable of executing instructions to, for example, implement operations of the example methods described herein, as may be represented by the flowcharts of the drawings that accompany this description, as well other methods described herein. Other example logic circuits capable of, for example, implementing operations of the example methods described herein include field programmable gate arrays (FPGAs) and application specific integrated circuits (ASICs). Examples of other operations including synchronizing operation of the general illumination emitter, separate from the UI emitter, to ensure that the general illumination emitter is generating an illumination light during image data capture by the imaging assemblies. The example processing platform 200 of FIG. 6 includes a processor 202 such as, for example, one or more microprocessors, controllers, and/or any suitable type of processor. The example processing platform 200 of FIG. 6 includes memory (e.g., volatile memory, non-volatile memory) 204 accessible by the processor 202 (e.g., via a memory controller). The example process 202 may include a decoder or analyzer that analyzes received image data and/or decodes indicia present therein. The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 6 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s).

The example, processing platform 200 of FIG. 6 also includes input/output (I/O) interfaces 208 to enable receipt of user input and communication of output data to the user.

The processing platform 200 further includes the first imaging assembly 104 with the first imaging sensor 122 and the second imaging assembly 106 with the second imaging sensor 124, each communicatively coupled to the processor 202 and the memory 204 through a data bus 210. In various embodiments, the PCB 161 and the PCB 163 are communicatively coupled to the data bus 210. Additionally, the UI emitter 130 is coupled to the data bus 210, as shown. Further, the illumination emitter 129 is coupled to the data bus 210, as shown.

The processing platform 200 further includes an imaging engine 212, which may capture images from the one or both of the imaging assemblies 104 and 106 and perform image analysis as well as various methods illustrated herein. In some embodiments, the first imaging assembly 104 may be a barcode imager where image capture and analysis functions, like barcode identification and decoding, may be performed by the imaging assembly 104. Similarly, in some embodiments, the second imaging assembly 106 may be a color imaging assembly where color image capture and analysis functions may be performed by the imaging assembly 106. To affect synchronization, the imaging engine 212 includes a synchronizer 214 having instructions to execute various of the methods illustrated herein. The imaging engine 212 may be an ASIC or FPGA based processor. Alternatively, the imaging engine 414 may be one or more programmable microprocessors, controllers, and/or any suitable type of processor capable of executing machine-readable instructions. In some examples, the processor 202 implements the imaging engine 212.

Figure 7:
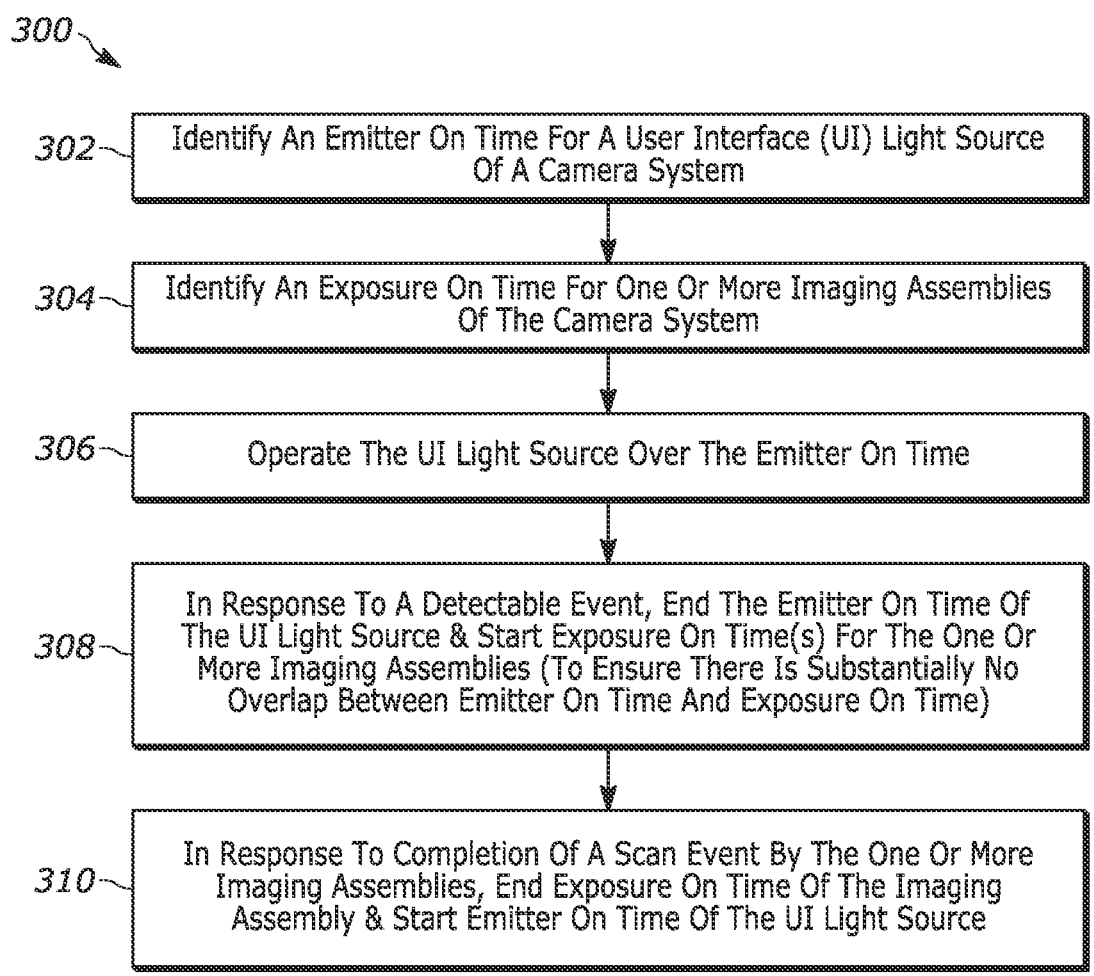
FIG. 7 illustrates an example process for synchronizing operation of a user interface emitter and one or more imaging assemblies of the image device of FIGS. 1-5 and 9-11.

FIG. 7 is a flowchart 300 representative of an example method, hardware logic, machine-readable instructions, or software for synchronizing operation of the UI emitter 130 and the imaging assemblies 104 and 106. Any or all of the blocks of FIG. 7 may be an executable program or portion(s) of an executable program embodied in software and/or machine-readable instructions stored on a non-transitory, machine-readable storage medium for execution by one or more processors such as the imaging engine 212 and/or the processor 202 of FIG. 6. Additionally and/or alternatively, any or all of the blocks of FIG. 7 may be implemented by one or more hardware circuits structured to perform the corresponding operation(s) without executing software or instructions. The example method 300 may be performed by a vision camera system, as described, or by a barcode imaging system, for example.

To synchronize operation, at a block 302, an emitter-on time for the UI emitter 130 is identified, the emitter-on time being a time duration over which the UI emitter 130 generates the user interface visible to a user. As noted above, the UI light may be used for a number of things: decode completion, error identification, malfunction indicator, device powered on, wireless connection established, operational mode, etc. The emitter-on time may be stored in the UI emitter 130 (for example on a memory of an emitter PCB 167), the memory 204, the imaging engine 212, or elsewhere on the imaging device. The emitter-on time may be a predetermined time duration. In some examples, time duration of the emitter-on time is adjustable under control of the UI emitter 130. In some examples, the UI emitter 130 is operated in a continuous on mode, where the emitter-on time starts in response to a detectable event, such as a scan detection event, and stops at a predetermined interval or in response to another detectable event, such as an end of a detection event. In some examples, the UI emitter 130 is operated in a pulsed mode, where user interface light is generated every emitter-on time, and those on times are cycled on and off in a pulsed manner according to a frequency rate.

At a block 304, an exposure-on time for one or more of the imaging assemblies 104 and 106 is identified, the exposure-on time being a time duration over which the respective imaging sensor is exposed (e.g., electrically) to capture an image. The exposure time may be stored at the respective imaging assemblies, such as on memories of the respective PCBs or on the memory 204, the imaging engine 212, or elsewhere. At a block 306, the UI emitter 130 is operated during normal operation, generating the user interface light visible to an operator. In some examples, the block 306 is executed in response to a scan event detected at the imaging device. Example scan events include a physical trigger activated a user. Other examples include detection of an object entering a FOV of one of the imaging assemblies. For example, in some embodiments, one of the imaging assemblies may periodically capture of an image of its respective FOV. In embodiments, where the second imaging assembly is a color imager with a wider FOV than a barcode imager of the first imaging assembly, the color imager may periodically capture images over its wider FOV to detect the presence of an object enter the FOV indicating the start of a scan event. In embodiments herein, one or both the imaging assemblies 104 and 106 may capture respective images at an imaging frame rate of 30 Hz or greater.

At a block 308, in response to a detectable event, the emitter-on time is stopped and correspondingly the UI emitter 130 stops generating the user interface. The exposure-on time of the one or more imaging assemblies is started. That is, the exposure-on time may be started for one or both of the imaging assemblies 104 and 106 in response to the stopping of the emitter-on time. In some embodiments, the block 308 is implemented to ensure there is not substantial overlap between the emitter-on time and the exposure-on time of one or each of the imaging assemblies, where substantially overlap as used herein means with no more than 10% of the emission on time being simultaneous with the emitter-on time.

In some embodiments, the block 308 is executed by the imaging engine 212, receiving a timing signal from the UI emitter 130 including that the emitter is operating during an emitter-on time, and in response the imaging engine 212 sends a stop signal and a start signal to the UI emitter 130 and one or more the imaging assemblies 104/106, respectively. In some embodiments, one or more of the imaging assemblies 104/106 receive the timing signal, indicating the emitter-on time status, from the UI emitter 130, and the one or more of the imaging assemblies 104/106 control the stop and start of the emitter-on time and emission on time, respectively, by communicating respective signals. In some embodiments, the UI emitter 130 controls the stop and start of the emitter-on time and emission on time. Communication of the timing signals and the stop and start signals may be achieved over a wired connection such as the data bus 210. A wired connection 169 from the second imaging assembly 106 that connects to the first imaging assembly 104 and/or the UI emitter 130, is shown in FIG. 2.

In some embodiments, including some embodiments where the second imaging assembly 106 is color imager and the first imaging assembly 104 is a barcode imager, a timing signal may be sent from the second imaging assembly 106 to the first imaging assembly 104 through a wired communication link, where the timing signal indicates the exposure-on time and/or exposure off time of the second imaging assembly. In response, the first imaging assembly 104 controls operation of the UI emitter 130 to operate the emitter-on time during the exposure off time of the second imaging assembly, including such that the times do not substantially overlap. In some such examples, both the UI emitter 130 and the first imaging assembly 104 may be positioned on and operated by the same PCB 161.

At the block 308, each of the one or more imaging assemblies will capture images over the respective fields of view (FOVs) of each imaging assembly, e.g., over a sampling time window. At a block 310, in response to completion of a scan event by the one or more imaging assemblies, the one or more exposure-on times are ended and the illumination emitter is entered into the emitter-on time. In some examples, the scan event determined at block 310 is a successful decode of a barcode or any indicia at the first imaging assembly 104. In some examples, the scan event is a successful identification of an object being scanned by the second imaging assembly 106 or a determination that an object that entered into a respective FOV has exited that FOV. The process 300 may repeat until the imaging device is turn off, goes into a sleep mode, or other control. FIG. 13 illustrates example synchronizations that may be achieved with the techniques herein, showing exposure-on times 350, 352 for first and second imaging assemblies, respectively, and an on-time 354 for a general illumination emitter showing that the general illumination emitter overlaps and therefore illuminates an environment appearing in one or more respective FOVs during one or both of these exposure-on times 350, 352. By contrast, the emitter-on time 356 of the UI emitter is synchronized to not overlap with these exposure-on times or not significantly overlap as in the example of emitter-on time 358.

Figure 8:
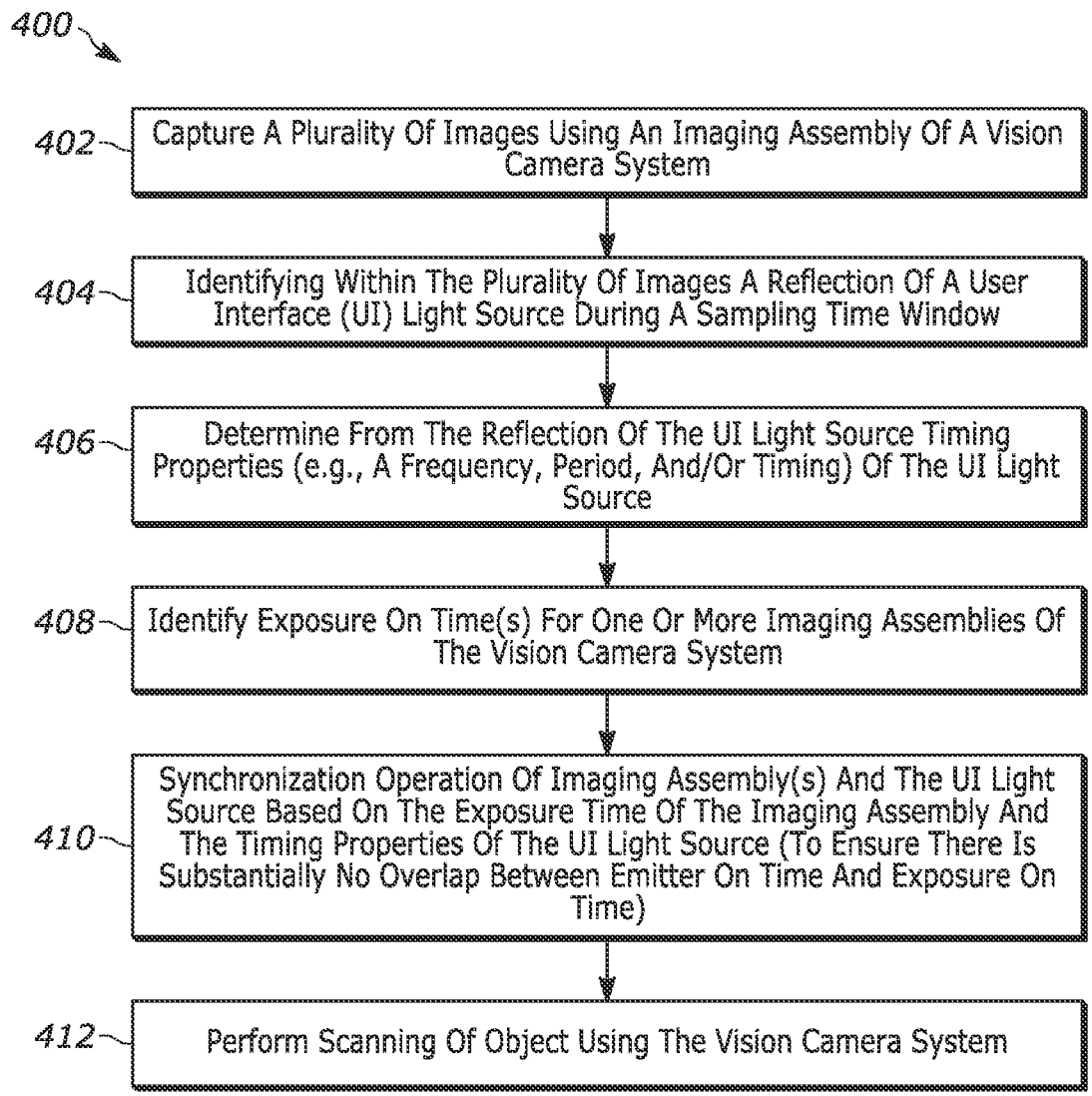
FIG. 8 illustrates another example process for synchronizing operation of a user interface emitter and one or more imaging assemblies of the image device of FIGS. 1-5 and 9-11.

FIG. 8 illustrates another example process 400, in which, vision camera system (having an imaging device) is able to determine operating parameters of an illumination emitter and then synchronize operation with the imaging assemblies. At a block 402, an imaging assembly, such as the second imaging assembly 106 implemented as a color imager, captures images of its respective FOV. At a block 404, the imaging assembly identifies, in the plurality of the images, a reflection (see location 171 of FIG. 2) of a UI visual indicator generated by the illumination emitter. The UI visual indicator may be identified based on the color, for example, by detecting a bright spot at a wavelength associated with the LED light source of the illumination emitter. The UI visual indicator may be identified based on location within the FOV. In some examples, the imaging assembly captures images over only a confined, predetermined region of the FOV, for example, over an upper region corresponding to where a UI visual indicator would be present. The imaging assembly, therefore, can search for the presence of an UI visual indicator within that confined region. In some examples, the imaging assembly captures an image over the entire FOV but only examines a confined, predetermined region of the captured image for the UI visual indicator. In some examples, the imaging assembly identifies a UI visual indicator that is a reflection from the optically transmissive window (see location 171 of FIG. 2). In some examples, such as that of the horizontal orientation of FIG. 3 where there are both a frame window and the optically transmissive window, the imaging assembly may identify UI visual indicator reflections (see locations 171 and 173 of FIG. 3) from each window, for example spaced apart reflections.

At the block 404, enough images are captured and analyzed to not only determine the presence of a UI visual indicator reflection, at block 404, but to determine, at block 406, one or more timing properties of the corresponding illumination emitter, for example, a frequency, period, and/or emitter-on time for the illumination emitter. With the timing properties for the illumination emitter determined, the exposure-on time for one or more imaging assemblies is identified at the block 408. At a block 410, synchronized operation of the one or more imaging assemblies and the illumination emitter is controlled to ensure no substantial overlap between exposure-on times and emitter-on times. At a block 412, the vision camera system performs object scanning in accordance with the synchronized operation established at block 410.

Figure 9:
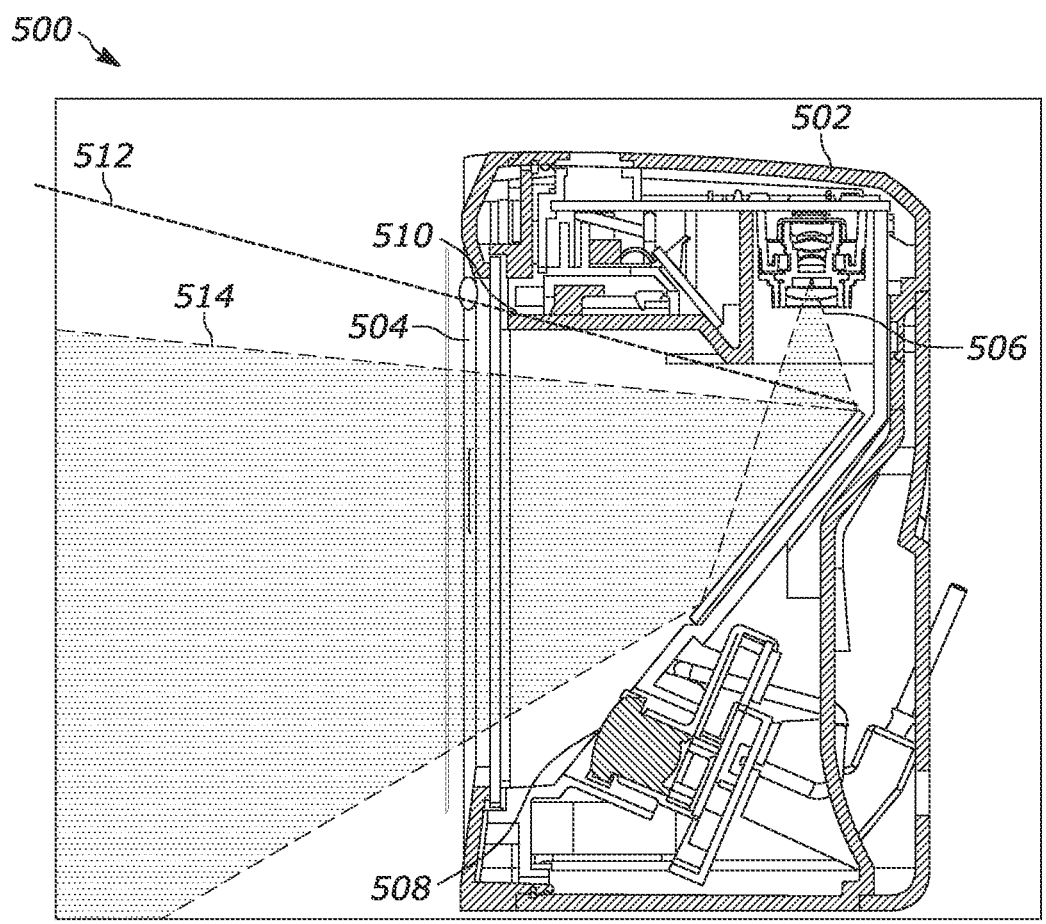
FIG. 9 illustrates a cross-section view of the example imaging device having a high-resolution barcode imager.

FIG. 9 illustrates an imaging device 500 having a housing 502 and optically transmissive window 504. A first imaging assembly 506 and a second imaging assembly 508 are mounted within the housing in a similar manner to that of the imaging device 100. Similarly, an illumination emitter 510 is positioned to generate an UI visual indicator. In the illustrated example, the first imaging assembly 506 is a higher resolution barcode imager, such as a barcode imager configured to generate 4 MP or 10 MP images, compared to a standard resolution barcode imager, such as a 2 MP imager. As shown, higher resolution barcode images will have a larger FOV 512 compared to a convention barcode resolution imager FOV 514. Unfortunately, as result of the larger FOV 512, the UI visual indicator may result in an internal reflection (see location 516) in an image captured by the barcode imager 506. In some such embodiments, the process 300 may be used to synchronization operation such that the barcode imager 506 exposure-on time does not substantially overlap with an emitter-on time of the emitter 510. In some embodiments, the process 400 may be used whereby the imager 508 identifies a UI visual indicator in images it captures, timing properties of the illumination emitter 510 are determined, and synchronized operation of the barcode imager 506 and the illumination emitter 510 is achieved. These embodiments ensure there is not bright flashes of the UI visual indicator in the captured images of the barcode reader.

Figure 10:
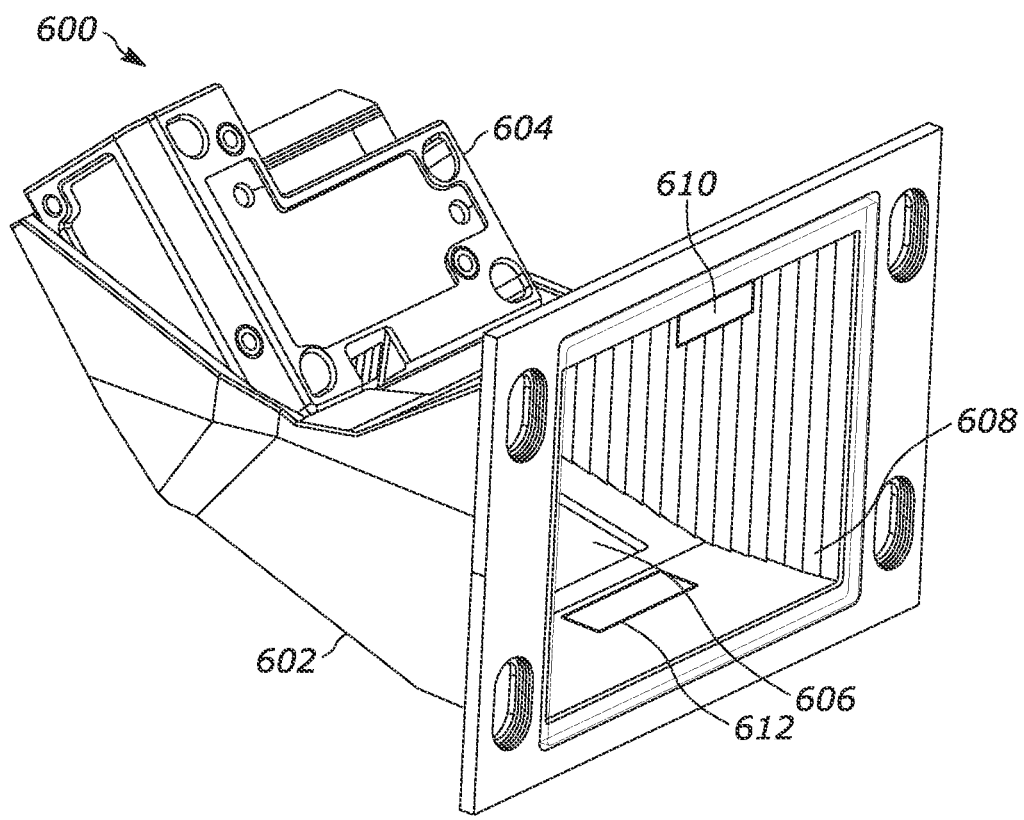
FIG. 10 illustrates a perspective view of another example imaging device having a first imaging sensor, a second imaging sensor, and a user interface emitter.

FIG. 10 illustrates an example imaging device 600 having a frame 602 and an imaging assembly module 604 mounted to rearward position of the frame 602, such that the imaging assembly or imaging assemblies (not shown) of the module 604 have FOVs that reflect off an internal mirror 606. In some examples, the module 604 includes a general illumination emitter and a UI emitter (both not shown), where the latter is mounted such that the UI visual indicator is also reflected off the internal mirror 606. In other examples, a UI emitter may be positioned near an optically transmissive window 608 of the frame 602. Example locations of such UI emitters are labeled 610 and 612. The configuration shows that the synchronization techniques herein may be implemented in vision camera systems in which light paths are reflected off internal mirrors in addition to being reflected, internally off of the optically transmissive window 608, and such synchronization control can still ensure that the UI visual indicator does not appear in capture images.

Figure 11:
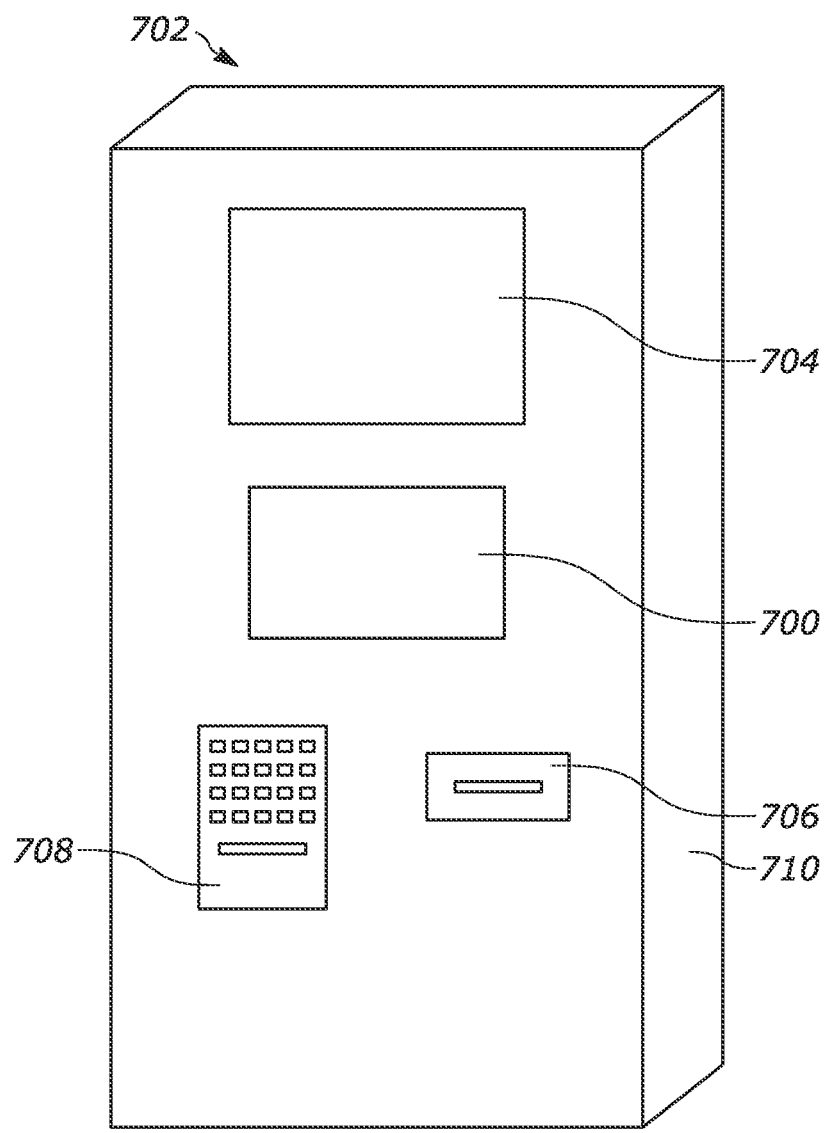
FIG. 11 illustrates an example imaging device placed within a kiosk.

FIG. 11 illustrates an imaging device 700, which may be one of the imaging devices described in other examples herein, that is placed within a kiosk 702 below a display 704 of the kiosk 702. In some arrangements, the kiosk 702 may further include a printer 706 and a payment terminal 708. The kiosk 700 includes a housing 710, and the entire imaging device 700 fits inside the housing 710.

The vision camera systems herein may be used in other processes that detect the presence of an internal reflection of the UI visual indicator and make an assessment of that presence for affecting downstream processes, such as generating an indication to a customer at an imaging device or to a computer remote from the imaging device. For example, by using the vision camera to capture, within image data, the reflection of the UI light when it is during an exposure-on time, the vision camera can be configured to detect events, such as detecting whether a decode took place, without explicitly sending the captured image data to the vision camera via a wired connection for decoding. For example, if an object is swiped through a FOV and the UI light does not change states, a vision camera's processor can determine that scan avoidance took place. In another example, when an error occurs at an imaging device, the UI light may be configured change from green to another color, such as red or yellow. In some examples, the vision camera can detect the color change and be configured to save the frames captured leading up to the moment of detection moment, and send those frames to a connected computer in order to help with the debug process.

Figure 12:
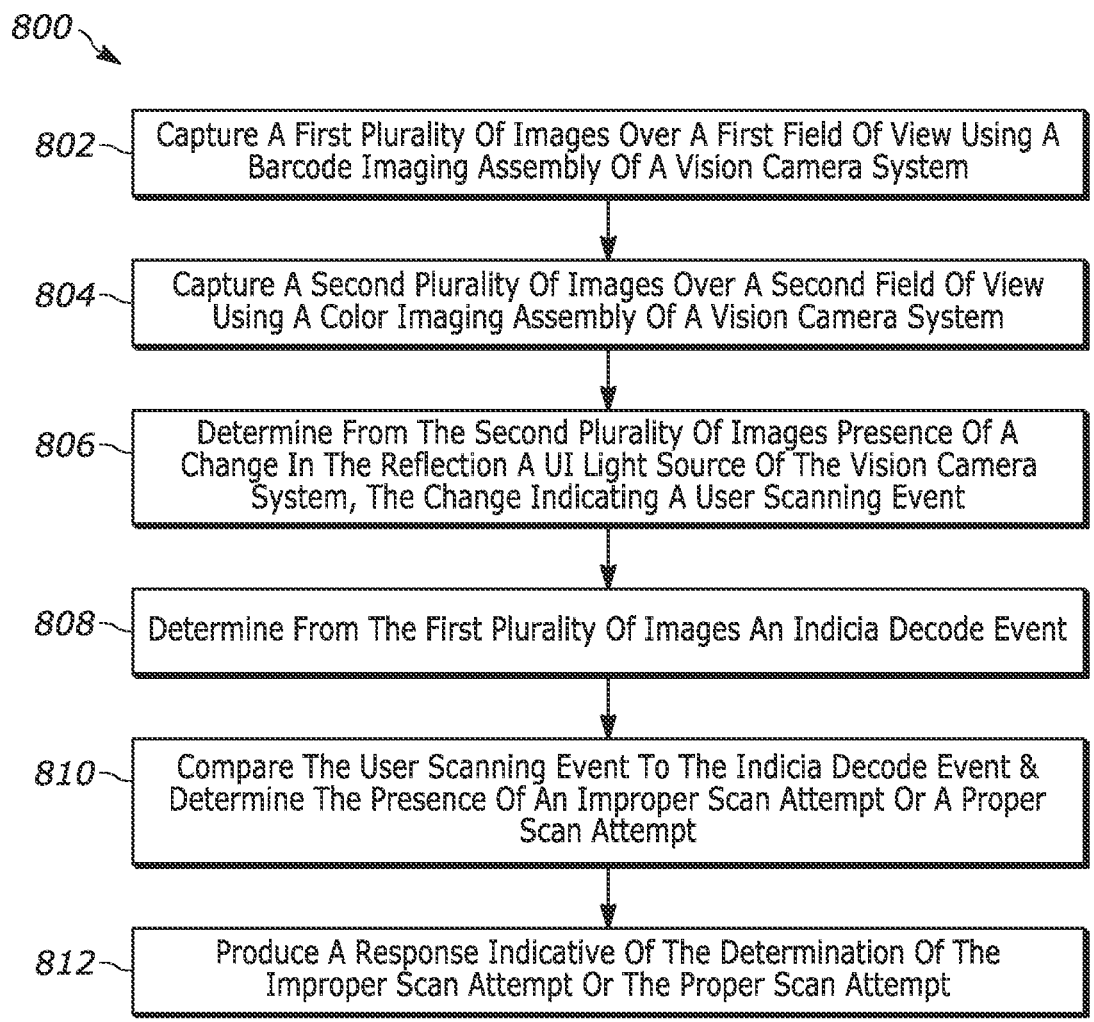
FIG. 12 illustrates an example process for identifying improper versus proper scan attempts by using detection of an internal reflection of a user interface emitter as may be performed by the imaging devices of FIGS. 1-5 and 9-11.

FIG. 12 illustrates another example process 800 that may be implemented by a vision camera system having an imaging device. The process 800 allows the vision camera system to use the internal reflection of UI visual indicator to assist with validation of a decode event, to determine if a proper scan attempt has occurred or if an improper scan attempt has occurred, such as an attempted theft such as sweethearting or scan avoidance. In an example, using the process 800, the vision camera system may detect when there are changes in the internal reflection of the UI visual indicator (e.g., from reflection to no reflection or no reflection to reflection) and validate or invalidate a scan attempt based on those detected changes.

At a block 802, the first imaging assembly 104 captures a first plurality of images over a corresponding FOV, for example, FOV 136. In an example, the first imaging assembly includes a barcode imager. At a block 802, the second imaging assembly 106 captures a second plurality of images over a corresponding FOV, for example, FOV 138, where the second imaging assembly 106 includes a color imager. At the block 806, the images captured from the second imaging assembly 106 are examined to identify the presence of a change in the internal reflection of the UI visual interface appearing in the captured images. Such changes may include identifying the presence of the internal reflection in a first subset of captured images and then the absence of the internal reflection in a subsequent subset of captured images. In another example, such changes may include identifying the lack of an internal reflection in a first subset of captures images and then the appearance of the internal reflection in a subsequent subset of captured images. As with other examples herein, the presence or lack or presence of the internal reflection may be determined by examining captured images for the presence of a particular color wavelength, a particular pattern, and/or a location of bright spots. The entire captured image may be examined or a portion of the image, such as an upper portion of the image or a narrow slit of the image.

Depending on the configuration, the vision camera system may be configured to pulse the UI visual interface generated by the UI emitter 130 during a scan attempt by the barcode imager. For example, during a scan event, the barcode imager and UI emitter 130 may be operated in synchronized manner where there is no substantial overlap in the exposure-on time and emitter-on time, as discussed in examples above. Although, block 806 and the process 800 may be performed by vision camera systems that do not deploy synchronization as discussed in various examples herein. In any event, in an example configuration, the vision camera system switches the illumination emitter from an emitter-on time to an emitter-off time or from an emitter-off time to an emitter-on time, upon a scan attempt by the barcode imager, where a scan attempt may be the detection of a barcode code or other indicia in the FOV and an attempted to decode operation. In the illustrated example, the decode attempt is detected at the block 808, by the barcode imager.

With the barcode imager performing a decode event (block 808) and with the color imager detecting a change in the UI visual interface (block 806), at a block 810 data from each process is compared, for exampling, in an imaging engine, and a determination is made as to whether a proper scan attempt or an improper scan attempt has occurred. For example, the block 810 may determine if a successful decode event in detected at block 808 and if that corresponds to a proper switching of UI visual interface detected at block 806. If the block 806 detects a switching of the UI visual interface that indicates a scan event is occurring, but the block 808 does not successfully decode an indicia in an image captured by the barcode imager, then the block 810 determines that an improper scan attempt has occurred, for example. A visual or auditory response indicative of the determined improper or proper scan attempt is produced at the block 812. That response may be presented as the vision camera system to be received by a customer or personnel nearby, that response may be communicated to an external computing system such as a computer terminal of a supervisor, or both, for example.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
a housing having an optically transmissive window;
one or more imaging assemblies mounted within the housing, each of the one or more imaging assemblies having an imaging sensor for capturing images of a respective environment appearing within a respective field of view (FOV) extending through the optically transmissive window and each of the one or more imaging assemblies having an exposure-on time during which the imaging sensor is exposed for image capture;
an illumination assembly mounted within the housing and configured to generate an illumination through the optically transmissive window during at least one of the exposure-on times;
a user interface (UI) light emitter mounted within the housing and configured to generate a UI visual indicator visible through the optically transmissive window during a UI emitter-on time;
one or more processors; and
a non-transitory computer-readable memory coupled to the one or more processors and storing instructions thereon that, when executed by the one or more processors, cause the one or more processors to;
synchronize operation of the user interface light emitter and the one or more imaging assemblies such that the UI light emitter-on time and the exposure-on time for each of the one or more imaging assemblies do not overlap significantly in time.

2. The imaging device of claim 1, wherein the one or more imaging assemblies comprises:
a first imaging assembly having a first imaging sensor configured to capture image data of an indicia within a respective environment appearing within the respective FOV of the first imaging assembly; and
a second imaging assembly having a second imaging sensor configured to capture image data of the respective environment appearing within the respective FOV of the second imaging assembly.

3. The imaging device of claim 2, wherein the second imaging sensor is a color imaging sensor.

4. The imaging device of claim 2, wherein the first imaging sensor is a barcode imaging sensor.

5. The imaging device of claim 1, wherein the memory stores instructions that, when executed by the one or more processors, cause the one or more processors to the synchronize operation of the user interface light emitter and the one or more imaging assemblies such that the UI light emitter-on time and the exposure-on time for each of the one or more imaging assemblies do overlap by 10% or less of the exposure-on time.

6. The imaging device of claim 1, wherein the memory stores instructions that, when executed by the one or more processors, cause the one or more processors to:
transmit a timing signal from the second imaging assembly to the first imaging assembly through a wired communication link, the timing signal indicating the exposure-on time and/or exposure off time of the second imaging assembly; and
in response to the timing signal, the one or more processors controlling the UI light emitter to operate during the UI emitter-on time during the exposure off time of the second imaging assembly.

7. The imaging device of claim 1, wherein the memory stores instructions that, when executed by the one or more processors, cause the one or more processors to:
receive from the second imaging assembly a plurality of the images in the second FOV over a sampling time window;
identify, in the plurality of the images, a reflection of the UI visual indicator during the sampling time window;
determine a frequency, period, and/or timing of the UI visual indicator; and
synchronize a frequency, period, and/or timing of the exposure-on time of the second imaging assembly, such that the UI light emitter-on time and the exposure-on time do not overlap in time.

8. The imaging device of claim 7, wherein the memory stores instructions that, when executed by the one or more processors, cause the one or more processors to:
instruct the second imaging assembly to capture the plurality of the images in the second FOV over a sampling time window by capturing the plurality of the images in a confined, predetermined region of the second FOV.

9. The imaging device of claim 7, wherein the identified reflection of the UI visual indicator is a reflection from the optically transmissive window.

10. The imaging device of claim 7, wherein the housing is mounted within a frame structure having a frame window external to the optically transmissive window, and wherein the identified reflection of the UI visual indicator is a reflection of one or both of the optically transmissive window and the frame window.

11. The imaging device of claim 1, wherein the respective FOVs are sized the same.

12. The imaging device of claim 1, wherein one of the respective FOVs is narrower than another of the respective FOV.

13. The imaging device of claim 1, wherein the UI light emitter is an LED light emitter or laser emitter.

14. The imaging device of claim 1, wherein the housing is configured for vertically or substantially vertically positioning the optically transmissive window, wherein substantially vertically is from +15° to −15° as measured from an external vertical plane.

15. The imaging device of claim 14, wherein the UI light emitter is mounted within the housing to coincide with an upper portion of the housing.

16. The imaging device of claim 14, wherein the UI light emitter is mounted within the housing to coincide with a lower portion of the housing.

17. The imaging device of claim 1, wherein one or more of the respective FOVs are defined by one or more internal mirrors within the housing.

18. The imaging device of claim 1, wherein the housing is configured for horizontally positioning the frame window and wherein the optically transmissive window is from +5° and −5° as measured from an external reference horizontal plane.

19. The imaging device of claim 1, wherein the UI light emitter is configured to generate the UI visual indicator in response to a scan event detected at the imaging device.

20. An imaging device comprising:
a housing having an optically transmissive window;
a first imaging assembly mounted within the housing including a first imaging sensor having a first field of view (FOV) extending through optically transmission window, the first imaging assembly being configured to capture image data of an indicia within the environment appearing in the first FOV;
a second imaging assembly mounted within the housing including a second imaging sensor having a second field of view (FOV) extending through optically transmission window, the second imaging assembly being configured to capture image data of an environment appearing within the second FOV during an exposure-on time;
an illumination assembly mounted within the housing and configured to generate an illumination through the optically transmissive window during at least one of the exposure-on times;
a user interface (UI) light emitter mounted within the housing and configured to generate a UI visual indicator visible through the optically transmissive window during a UI emitter-on time, the UI light emitter further configured to change states between the UI emitter-on time and a UI emitter-off time in response a trigger event at the imaging device;
one or more processors; and
a non-transitory computer-readable memory coupled to the one or more processors and storing instructions thereon that, when executed by the one or more processors, cause the one or more processors to;
determine from the captured images of the second imaging assembly whether the UI light emitter changed states between the UI emitter-on time and the UI emitter-off time indicating a user scanning event at the imaging device;
determining at the first imaging assembly an indicia decode event; and
responsive to a comparison of the user scanning event and the indicia decode event, determining between an improper scan attempt and a proper scan attempt.

21. The imaging device of claim 20, wherein the memory stores instructions that, when executed by the one or more processors, cause the one or more processors to:
determine from the captured images when the UI light emitter changes states from the UI emitter-on time to the UI emitter-off time indicating the user scanning event.

22. The imaging device of claim 20, wherein the memory stores instructions that, when executed by the one or more processors, cause the one or more processors to:
determine from the captured images when the UI light emitter changes states from the UI emitter-off time to the UI emitter-on time indicating the user scanning event.

23. The imaging device of claim 20, wherein the UI light emitter is configured to change states between the UI emitter-on time and the UI emitter-off time in response an attempt to decode the indicia.

24. The imaging device of claim 20, wherein the memory stores instructions that, when executed by the one or more processors, cause the one or more processors to determine from the captured images of the second imaging assembly whether the UI light emitter changed states between the UI emitter-on time and the UI emitter-off time by:
capturing the images over a confined, predetermined region of the second FOV; and
identifying the UI visual indicator in one or more of the capture images.

25. The imaging device of claim 20, wherein the second imaging sensor is a color imaging sensor.

26. The imaging device of claim 20, wherein the first imaging sensor is a barcode imaging sensor.

27. The imaging device of claim 20, wherein the UI light emitter is an LED light emitter or laser emitter.

28. The imaging device of claim 20, wherein the housing is configured for vertically or substantially vertically positioning the optically transmissive window, wherein substantially vertically is from +15° to −15° as measured from an external vertical plane.

29. The imaging device of claim 20, wherein the housing is configured for horizontally positioning the frame window and wherein the optically transmissive window is from +5° and −5° as measured from an external reference horizontal plane.

* * * * *